(12) United States Patent
Harmon

(10) Patent No.: US 11,225,778 B2
(45) Date of Patent: Jan. 18, 2022

(54) SYSTEMS AND METHODS FOR MONITORING THE WEAR OF A SHANK ATTACHMENT MEMBER OF AN AGRICULTURAL IMPLEMENT

(71) Applicant: CNH Industrial America LLC, New Holland, PA (US)

(72) Inventor: Joshua David Harmon, Lititz, PA (US)

(73) Assignee: CNH Industrial America LLC, New Holland, PA (US)

(*) Notice: Subject to any disclaimer, the term of this patent is extended or adjusted under 35 U.S.C. 154(b) by 29 days.

(21) Appl. No.: 16/366,702

(22) Filed: Mar. 27, 2019

(65) Prior Publication Data

US 2020/0308810 A1    Oct. 1, 2020

(51) Int. Cl.
| | |
|---|---|
| E02F 9/26 | (2006.01) |
| E02F 9/28 | (2006.01) |
| G07C 5/00 | (2006.01) |
| G07C 5/08 | (2006.01) |
| A01B 23/02 | (2006.01) |

(52) U.S. Cl.
CPC ............ *E02F 9/267* (2013.01); *E02F 9/2808* (2013.01); *G07C 5/006* (2013.01); *G07C 5/0808* (2013.01); *A01B 23/02* (2013.01)

(58) Field of Classification Search
CPC ....... E02F 9/267; G07C 5/006; G07C 5/0808; G07C 5/0833
See application file for complete search history.

(56) References Cited

U.S. PATENT DOCUMENTS

| | | | |
|---|---|---|---|
| 4,027,409 A | 6/1977 | Stepe et al. | |
| 5,605,196 A | 2/1997 | Grimm et al. | |
| 5,964,300 A | 10/1999 | Wattonville et al. | |
| 6,607,040 B2 | 8/2003 | Skjaeveland | |

(Continued)

FOREIGN PATENT DOCUMENTS

| | | |
|---|---|---|
| CA | 2993410 | 2/2017 |
| DE | 102011005317 | 9/2012 |

(Continued)

OTHER PUBLICATIONS

"'Shear Bolt Monitor' for Ripper and Knife Shanks," Farm Show Magazine, vol. 42, Issue 2, p. 24, 2018.

*Primary Examiner* — Peter D Nolan
*Assistant Examiner* — Kenneth M Dunne
(74) *Attorney, Agent, or Firm* — Rebecca L. Henkel; Rickard K. DeMille

(57) ABSTRACT

A system for monitoring wear of shank attachment members of an agricultural implement includes a shank extending between a proximal end and a distal end, the proximal end configured to be pivotally coupled to a portion of the agricultural implement, a shank attachment member coupled to the distal end of the shank, a non-contact sensor positioned remote to the shank attachment member, the non-contact sensor configured to detect a parameter indicative of wear of the shank attachment member, and a controller communicatively coupled to the non-contact sensor. The controller is configured to determine a status of the wear of the shank attachment member based on sensor data received from the non-contact sensor while the shank attachment member is above ground.

16 Claims, 9 Drawing Sheets

(56) References Cited

U.S. PATENT DOCUMENTS

| | | |
|---|---|---|
| 7,588,091 B1 | 9/2009 | Neudorf et al. |
| 9,243,381 B2 * | 1/2016 | Behmlander .......... G01N 29/07 |
| 9,613,413 B2 | 4/2017 | Hasselbusch et al. |
| 9,670,648 B2 | 6/2017 | Kanniappan et al. |
| 9,714,923 B2 | 7/2017 | Behmlander et al. |
| 10,024,033 B2 | 7/2018 | Bewley et al. |
| 10,024,034 B2 | 7/2018 | Nicoson et al. |
| 2011/0162241 A1 | 7/2011 | Wangsness |
| 2013/0082846 A1 | 4/2013 | McKinlev et al. |
| 2018/0235154 A1 | 8/2018 | Neitemeier et al. |
| 2018/0349863 A1 * | 12/2018 | Restum ................... E02F 9/267 |
| 2020/0063402 A1 * | 2/2020 | Leslie ..................... E02F 9/267 |

FOREIGN PATENT DOCUMENTS

| | | | |
|---|---|---|---|
| EP | 3335532 A1 * | 6/2018 | ......... A01B 63/1112 |
| JP | 6322076 B2 * | 5/2018 | ............. B23Q 17/08 |
| WO | WO 2021041988 A1 * | 3/2021 | ............ E02F 9/2808 |

\* cited by examiner

SYSTEMS AND METHODS FOR MONITORING THE WEAR OF A SHANK ATTACHMENT MEMBER OF AN AGRICULTURAL IMPLEMENT

FIELD OF THE INVENTION

The present subject matter relates generally to agricultural implements and, more particularly, to systems for monitoring the status of shank attachment members of an agricultural implement and related methods.

BACKGROUND OF THE INVENTION

A wide range of agricultural implements have been developed and are presently in use for tilling, cultivating, harvesting, and so forth. Tillage implements, for example, are commonly towed behind tractors and may cover wide swaths of ground that include various types of residue. Such residue may include materials left in the field after the crop has been harvested (e.g., stalks and stubble, leaves, and seed pods). Good management of field residue can increase efficiency of irrigation and control of erosion in the field.

Tillers typically include ground-engaging tools, such as shanks and shank attachment members (e.g., tillage points, chisels, etc.), configured to condition the soil for improved moisture distribution while reducing soil compaction from sources such as machine traffic, grazing cattle, and standing water. The shank attachment members are typically replaceable and come in a wide variety to accommodate different field conditions and the desired results of the tilling operation. Unfortunately, monitoring the wear on shank attachment members is time consuming and relies heavily on the operator to determine when it is time to replace each shank attachment member. Further, when a shank attachment member falls off or otherwise decouples from its respective shank during operation, the shank attachment member is typically difficult to find and expensive to replace, and the shank may also need to be replaced if the implement is operated for an extended period without a shank attachment member, which further increases the cost of a lost shank attachment member.

Accordingly, a system and method for improved monitoring of shank attachment members configured for use with an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a wear monitoring system for shank attachment members of an agricultural implement. The wear monitoring system generally includes a shank extending between a proximal end and a distal end, where the proximal end is configured to be pivotally coupled to a portion of the agricultural implement. The wear monitoring system also includes a shank attachment member coupled to the distal end of the shank and a non-contact sensor positioned remote to the shank attachment member, where the non-contact sensor is configured to detect a parameter indicative of wear of the shank attachment member. Additionally, the wear monitoring system includes a controller communicatively coupled to the non-contact sensor, with the controller configured to determine a status of the wear of the shank attachment member based on sensor data received from the non-contact sensor.

In another embodiment, the present subject matter is directed to an agricultural implement having a frame actuatable relative to the ground between a raised position and a lowered position. The agricultural implement further includes a shank extending between a proximal end and a distal end, with the proximal end being pivotally coupled to the frame. The agricultural implement also includes a shank attachment member coupled to the distal end of the shank and a non-contact sensor coupled to the frame, with the non-contact sensor being configured to detect a parameter indicative of wear of the shank attachment member. Additionally, a controller is communicatively coupled to the non-contact sensor, with the controller being configured to determine a status of the wear of the shank attachment member based on sensor data received from the non-contact sensor.

In a further embodiment, the present subject matter is directed to a method for monitoring wear of a shank attachment member of an agricultural implement. The agricultural implement generally includes a frame actuatable relative to the ground between a raised position and a lowered position and a shank extending between a proximal end and a distal end, with the proximal end being pivotally coupled to the frame. The agricultural implement also includes a shank attachment member coupled to the distal end of the shank. The method includes receiving, with a computing device, an input indicative of the wear of the shank attachment member from a non-contact sensor coupled to the frame. The method further includes comparing, with the computing device, the input with a predetermined wear threshold for the shank attachment member. Additionally, the method includes determining, with the computing device, a status of the wear of the shank attachment member based on the comparison of the input with the predetermined wear threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
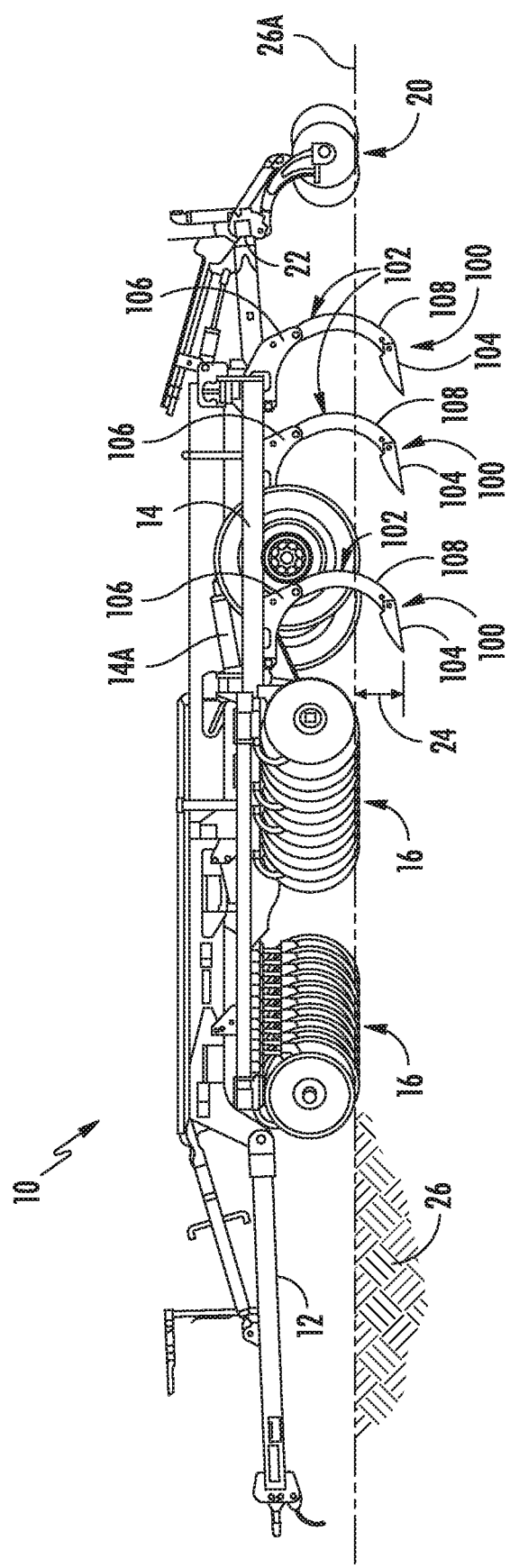
FIG. 1 illustrates a side view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the status of shank attachment members of an agricultural implement, such as the presence of and/or the amount of wear on a given shank attachment member. Specifically, in several embodiments, a controller of the disclosed system may be configured to receive data from one or more sensors configured to detect the presence and/or wear of a respective shank attachment member. For example, an agricultural implement may include a plurality of shank assemblies, with each shank assembly including a shank and a shank attachment member configured to be coupled to a distal end of the shank. In such an embodiment, the agricultural implement may also include one or more sensors for detecting the wear and/or presence of one or more of the shank attachment members. For instance, in one embodiment, a wear sensor(s) (e.g., a non-contact-based sensor) may be disposed remotely from one or more shank attachment members and configured to detect the amount of wear on such member(s). In another embodiment, a wear sensor(s) may be disposed within or otherwise provided in direct operative association with a respective shank attachment member to detect the amount of wear on such member(s). In addition to such wear sensor(s) (or as an alternative thereto), a presence sensor may be disposed at least partially within one or more of the shanks to allow the presence of the adjacent shank attachment member(s) associated with such shank(s) to be monitored. Regardless of the sensor configuration, the system controller may be configured monitor an input from the associated sensor(s) to determine when the corresponding shank attachment member(s) needs to be replaced and/or when each shank attachment member is no longer installed on its respective shank. In response to such a determination, the controller may, for example, indicate the status of the monitored shank attachment member(s) (e.g., via a user interface) to the operator, and/or initiate one or more control actions, such as raising the frame of the implement and/or stopping the implement, based on the monitored status of the shank attachment member.

Referring now to the drawings, FIG. 1 illustrates one embodiment of a tillage implement 10 in accordance with aspects of the present subject matter. As is generally understood, the tillage implement 10 may be used to till a field to prepare the soil by plowing, ripping, turning, and/or the like. In doing so, a portion of the soil residue, such as plant stalks and/or weeds, may be removed during the tilling process. In addition, the soil may be loosened and aerated, which in turn facilitates deeper penetration of roots. The tilling process may also help in the growth of microorganisms present in the soil and thus, maintain the fertility of the soil.

As shown in FIG. 1, the tillage implement 10 includes a tow bar 12 having a coupling mechanism, such as a hitch, used to couple the implement 10 to a towing vehicle, such as a tractor. The tillage implement 10 may also include a frame 14 and a plurality of ground-engaging tools coupled to or otherwise supported by the frame 14, such as one or more disk blades, plows, chisels, hoe openers, tillage points, rolling baskets, and/or the like. For instance, in the illustrated embodiment, the tillage implement 10 includes a plurality of forward disc blades 16, a plurality of shank assemblies 100, and a plurality of soil-leveling discs 20 coupled to the frame 14, with the shank assemblies 100 being located aft of the forward disc blades 16 on the frame 14 and the soil-leveling discs 20 being positioned aft of the shank assemblies 100 on the frame 14 (e.g., via an associated tool bar 22). The frame 14 is configured to be actuated relative to the ground 26 between a raised position (FIG. 4) and a lowered or working position by one or more frame actuators 14A.

As shown in FIG. 1, in one embodiment, each shank assembly 100 may include both a shank 102 pivotally coupled to the implement frame 14 at one end and a shank attachment member 104 coupled to the shank 102 at its opposed end. In the embodiment shown, each shank attachment member 104 corresponds to a tillage point. As is generally understood, the tillage points 104 may be configured to enable high-speed operation of the tillage implement 10 while still producing a smooth soil surface. As shown in the illustrated embodiment, the shank assemblies 100 are positioned to till a field at a depth 24 below the field or ground surface 26A, with the depth 24 of the tillage points 104 being adjustable by raising or lowering the shank assemblies 100 and/or the portions of the frame 14 relative to the field. For example, the depth 24 may be adjusted, as desired, based on local farming practices and/or field conditions. For purposes of discussion, the present subject matter will generally be described with reference to the illustrated tillage points 104. However, it should be appreciated that, in other embodiments, each shank attachment member 104 may correspond to any other ground-engaging member configured to be coupled or attached to the distal end of a shank 102, e.g., chisels, hoe openers, and/or the like.

Figure 2:
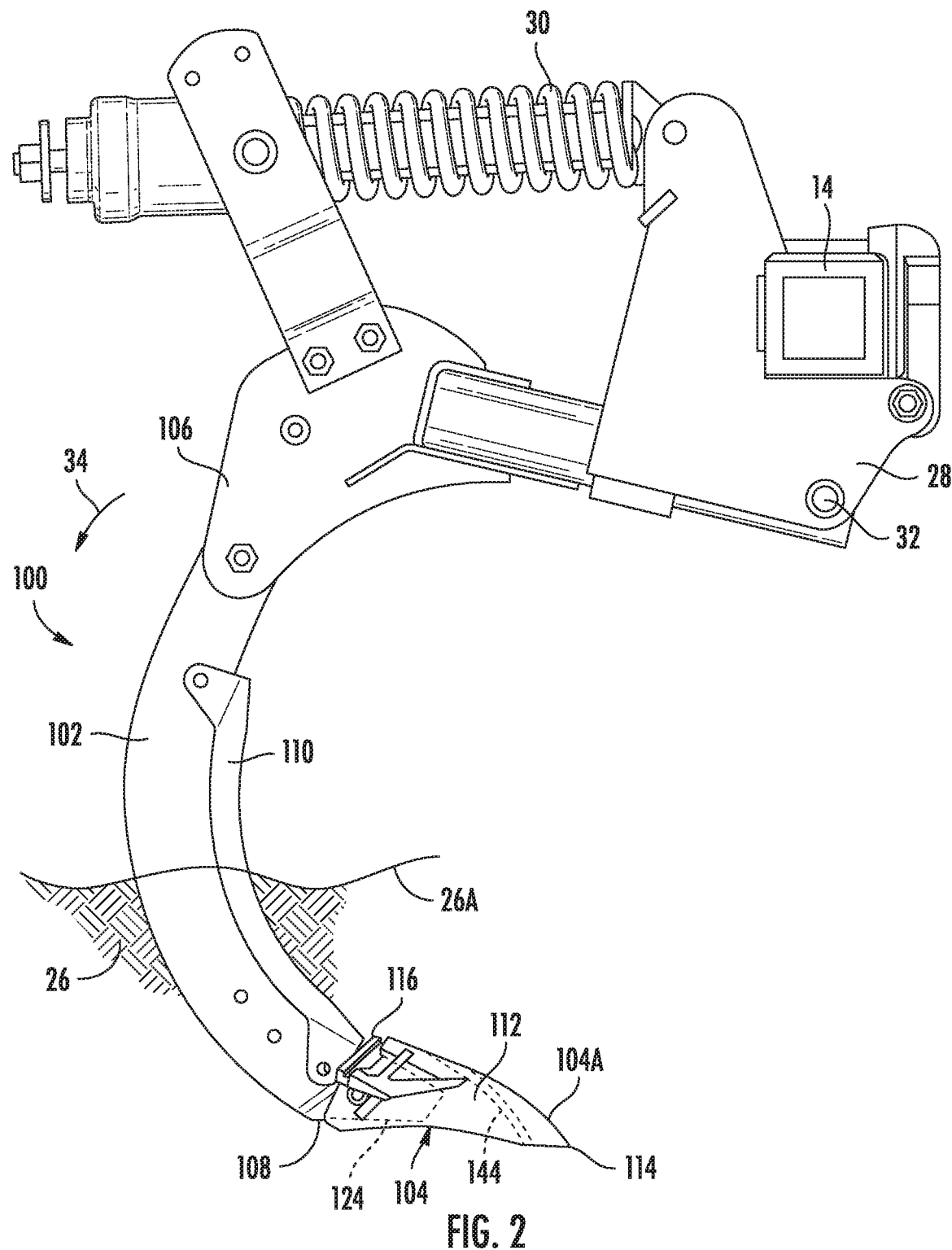
FIG. 2 illustrates a side view of a shank assembly of the agricultural implement shown in FIG. 1, particularly illustrating a shank attachment member coupled to a shank in accordance with aspects of the present subject matter.

Referring now to FIG. 2, a side view of an example embodiment of a shank assembly 100 suitable for use with an agricultural implement (e.g., the tillage implement 10 shown in FIG. 1) is illustrated in accordance with aspects of the present subject matter. It should be appreciated that, for purposes of discussion, the shank assembly 100 will be described with reference to the tillage implement 10 shown in FIG. 1. However, those of ordinary skill in the art will readily appreciate that the disclosed shank assemblies 100 may be utilized with any suitable agricultural implements having any other suitable implement configuration(s).

In general, as shown in FIG. 2, the shank assembly 100 may include a shank 102 configured to be pivotally coupled to the implement frame 14 and a tillage point 104 configured to be coupled to the shank 102. For instance, the shank 102 may extend lengthwise between a proximal end 106 and a distal end 108, with the proximal end 106 being configured to be coupled to the implement frame 14, e.g., via a mount 28 rigidly coupled to the implement frame 14, and the distal end 108 being configured to be coupled to the tillage point 104. As shown in FIG. 2, the shank assembly 100 may also include a biasing member 30 (e.g., a spring) coupled between the shank 102 and the mount 28 to bias the shank 102 towards its ground-engaging position relative to the frame (e.g., the position shown in FIG. 2). For instance, the biasing member 30 may bias the shank 102 downwardly such that the shank pivots about a pivot point 32 defined between the shank 102 and the mount 28 back towards its ground-engaging position (e.g., in pivot direction indicated by arrow 34) following temporary pivotal movement of the shank 102 in the opposite direction as the shank 102 encounters rocks or other impediments in the field during operation of the implement 10. Additionally, in some embodiments, the shank assembly 100 may include a shin 110 configured to be coupled to the shank 102 above the tillage point 104 to protect the shank 102 from wear.

Still referring to FIG. 2, the tillage point 104 may generally include a body 112 extending lengthwise between a tip end 114 and an opposed retention end 116. In general, the tip end 114 of the tillage point 104 may be configured to enable high-speed operation of the tillage implement 10, while still producing a smooth soil surface 26A. For instance, in one embodiment, the orientation of the tip end 114 of the body 112 may be angled downwardly with respect to a horizontal plane of movement of the tillage point 104 through the soil 26, which may reduce the overall amount of drag on the body 112 during operation of the implement 10. In addition, the tip end 114 of the body 112 may be substantially flat in the lateral or cross-wise direction of the body 112, thereby further reducing drag on the body 112. However, in other embodiments, the tip end 114 of the tillage point 104 may have any other suitable configuration that allows the tillage point 104 to generally function as described herein. Moreover, the retention end 116 of the body 112 may generally be configured to allow the distal end 108 of the shank 102 to be coupled to the tillage point 102. For instance, in one embodiment, the body 112 includes a retention slot 124 defined therein for receiving the distal end 108 of the shank 102.

In one embodiment, as is particularly shown in FIG. 2, the body 112 of the tillage point 104 defines an outer surface 104A. As the tillage point 104 is used to till the soil 26, the outer surface 104A of the tillage point 104 wears down. In several embodiments, the tillage point 104 is configured to be replaced once the tillage point 104 has undergone a certain amount of wear. As will be described below, a wear threshold 144 may be defined for the tillage point 104 that is defined a given threshold distance below the unworn outer surface 104A of the tillage point 104. Thus, as the outer surface 104A wears down over time, the distance between the outer surface 104A and the wear threshold 144 may be reduced. When the outer surface 104A reaches or exceeds the wear threshold 144, the tillage point 104 should be replaced. Several systems and methods will be described below in detail for automatically determining the status of the tillage point 104.

Figure 3:
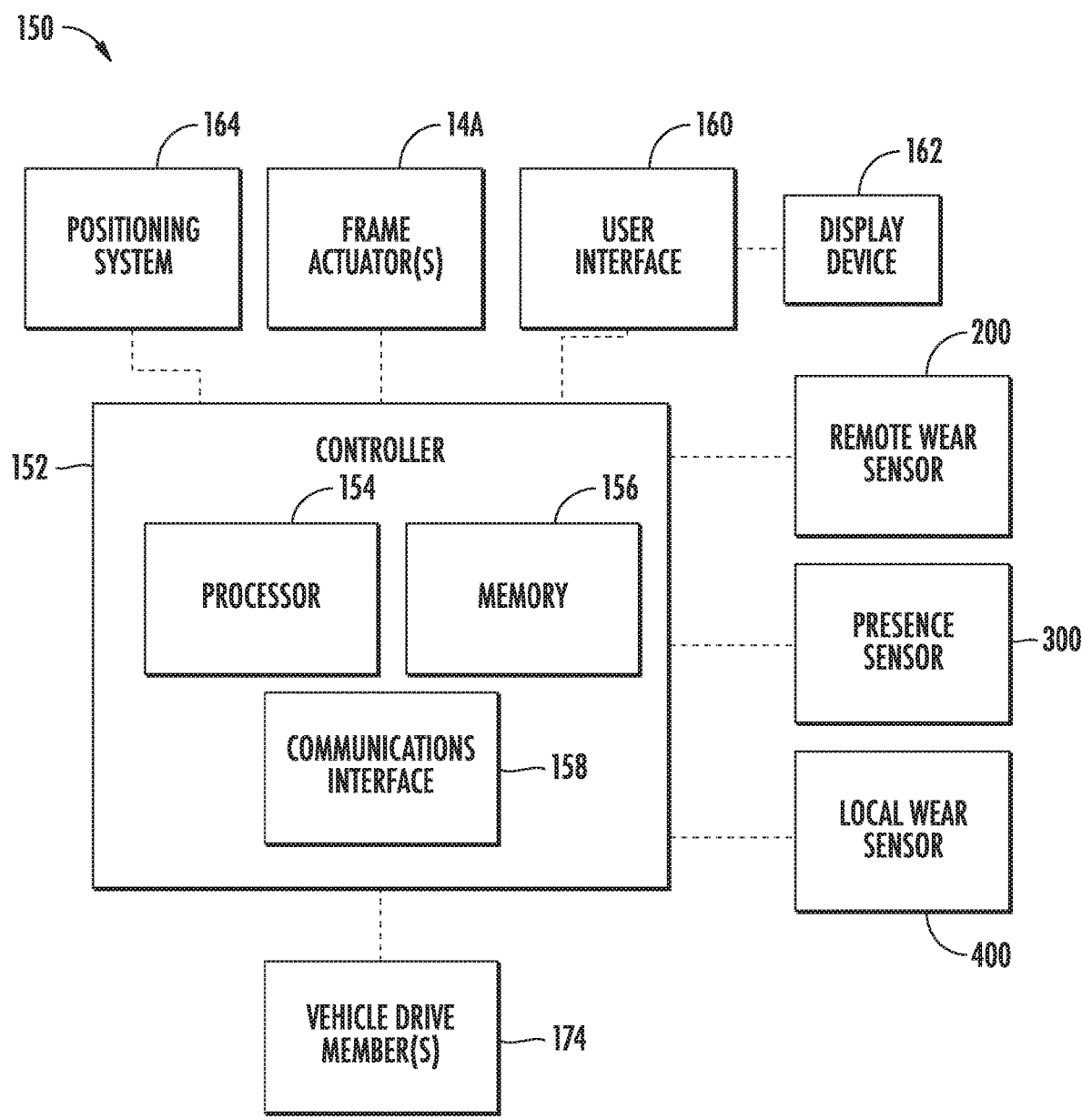
FIG. 3 illustrates a schematic view of one embodiment of a system for monitoring the wear and/or presence of the shank attachment members of the agricultural implement shown in FIG. 1 in accordance with aspects of the present subject matter.

Referring now to FIG. 3, a schematic view of one embodiment of a system 150 for monitoring the status of the shank attachment members of an agricultural implement (e.g., the amount of wear and/or the presence of the shank attachment members) is illustrated in accordance with aspects of the present subject matter. In general, the system 150 will be described herein with reference to the agricultural implement 10 described above with reference to FIG. 1 and the shank assembly 100 described above with reference to FIG. 2. However, it should be appreciated by those of ordinary skill in the art that the disclosed system 150 may generally be used with agricultural implements 10 having any other suitable implement configuration and/or shank assemblies 100 having any other suitable shank configuration.

As shown in FIG. 3, the system 150 may include a controller 152 configured to electronically control the operation of one or more components of the agricultural implement 10 and/or the work vehicle to which the implement 10 is coupled. In general, the controller 152 may comprise any suitable processor-based device known in the art, such as a computing device or any suitable combination of computing devices. Thus, in several embodiments, the controller 152 may include one or more processor(s) 154, and associated memory device(s) 156 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 156 of the controller 152 may generally comprise memory element(s) including, but not limited to, a computer readable medium (e.g., random access memory PAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the processor(s) 154, configure the controller 152 to perform various computer-implemented functions, such as one or more aspects of the methods and algorithms that will be described herein, in addition, the controller 152 may also include various other suitable components, such as a communications circuit or module, one or more input/output channels, a data/control bus and/or the like.

It should be appreciated that, in several embodiments, the controller 152 may correspond to an existing controller of the agricultural implement 10 and/or of the work vehicle to which the implement 10 is coupled. However, it should be appreciated that, in other embodiments, the controller 152 may instead correspond to a separate processing device. For instance, in one embodiment, the controller 152 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 152 may be configured to include a communications module or interface 158 to allow for the controller 152 to communicate with any of the various other system components described herein. For instance, in several embodiments, the controller 152 may be configured to receive data from one or more sensors of the agricultural implement 10 that are used to monitor the status of the tillage points 104, such as one or more wear-detecting sensors (e.g., one or more non-contact wear sensors 200 and/or one or more local wear sensors 400) and/or one or more presence-detecting sensors (e.g., one or more installation sensors 300). The controller 152 may be communicatively coupled to the sensor(s) 200, 300, 400 via any suitable connection, such as a wired or wireless connection, to allow data indicative of the condition of the tillage points to be transmitted from the sensor(s) 200, 300, 400 to the controller 152.

As will be described below, the controller 152 may be configured to determine the status of the wear and/or presence of each of the tillage points 104 based on the data received from the one or more sensors 200, 300, 400. For example, the controller 152 may include one or more suitable algorithms stored within its memory 156 that, when executed by the processor 154, allow the controller 152 to determine the status of the wear and/or presence of the tillage points 104 based on the data from the one or more sensors 200, 300, 400. The controller 152 may be configured to monitor the status of the wear of the tillage point 104 periodically, continuously, or only as demanded by an operator of the implement 10. For example, in some embodiments, the controller 152 may collect data from one or more of the sensors 200, 300, 400 periodically based on some predetermined delay period or sampling frequency, such as after a predetermined period of time (e.g., a set amount of operating time), after a certain operating distance covered (e.g., a set amount of acres worked by the implement 10), after a certain number of actuations of the frame 14 between its raised and lowered positions, and/or the like.

Further, in some embodiments, the controller 152 may be configured to indicate to an operator the status of the wear and/or the presence (or lack thereof) of each of the tillage points 104. For example, in the embodiment shown in FIG. 3, the communications module 158 may allow the controller 152 to communicate with a user interface 160 having a display device 162, with the display device 162 being configured to display wear and/or presence information regarding one or more of the tillage points 104. However, it should be appreciated that the controller 152 may instead be coupled to any number of other indicators, such as lights, alarms and/or the like to provide an indicator to the operator regarding the condition of the tillage points 104.

Additionally, in embodiments in which the controller 152 is configured to monitor the installation status or presence of one or more of the tillage points 104 (e.g., via the installation sensor(s) 300), the controller 152 may, for example, indicate to an operator the location within the field at which each monitored tillage point falls off or otherwise becomes decoupled from its respective shank 102. For example, in the embodiment shown in FIG. 3, the controller 152 is configured to be in communication with a positioning system 164 (e.g., a GPS-based positioning system), with the positioning system 164 being configured to identify the current location of the implement 10. In such an embodiment, the controller 152 may be configured to monitor the current location of the implement 10 as it simultaneously monitors the installation status or presence of each monitored point 104. When it is detected that a given point 104 is no longer installed relative to its respective shank 102, the controller 152 may store the current field location of the implement 10 within its memory. The controller 152 may then create an alert or log of alerts to indicate to an operator the location(s) of the missing tillage point(s) 104 within the field, which may, for example, be displayed to the operator via the user interface 160.

In further embodiments, the controller 152 may be configured to perform one or more implement-related control actions based on the determination of the status of the wear and/or presence of the various tillage points 104. Specifically, in some embodiments, the controller 152 may be configured to control one or more components of the agricultural implement 10 based on the determination of the wear and/or presence of the tillage points 104. For example, as shown in FIG. 3, the controller 152 may be configured to control one or more frame actuators 14A to move the implement frame 14 into its raised position when it is determined that one or more of the tillage points 104 is missing or needs to be replaced.

Additionally or alternatively, in some embodiments, the controller 152 may be configured to perform one or more vehicle-related control actions based on the determination of the status of the wear and/or presence of the tillage points 104. For example, as shown in FIG. 3, in some embodiments, the controller 152 may be configured to control the operation of one or more vehicle drive components 174 configured to drive the vehicle coupled to the implement, such as the engine and/or the transmission of the vehicle. In such embodiments, the controller 152 may be configured to control the operation of the vehicle drive component(s) 174 based on the determination of the wear and/or presence of the tillage points 104, for example, to bring the vehicle and implement 10 to a stop when it is determined that one or more of the tillage points 104 is missing or needs to be replaced.

It should be appreciated that, depending on the type of controller 152 being used, the above-described control actions may be executed directly by the controller 152 or indirectly via communications with a separate controller. For instance, when the controller 152 corresponds to an implement controller of the implement 10, the controller 152 may be configured to execute the implement-related control actions directly while being configured to execute the vehicle-related control actions by transmitting suitable instructions or requests to a vehicle-based controller of the vehicle towing the implement 10 (e.g., using an ISObus communications protocol). Similarly, when the controller 152 corresponds to a vehicle controller of the vehicle towing the implement 10, the controller 152 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 152 may be configured to execute both the implement-based control actions and the vehicle-based control actions directly or the controller 152 may be configured to execute both of such control action types indirectly via communications with a separate controller.

Figure 4:
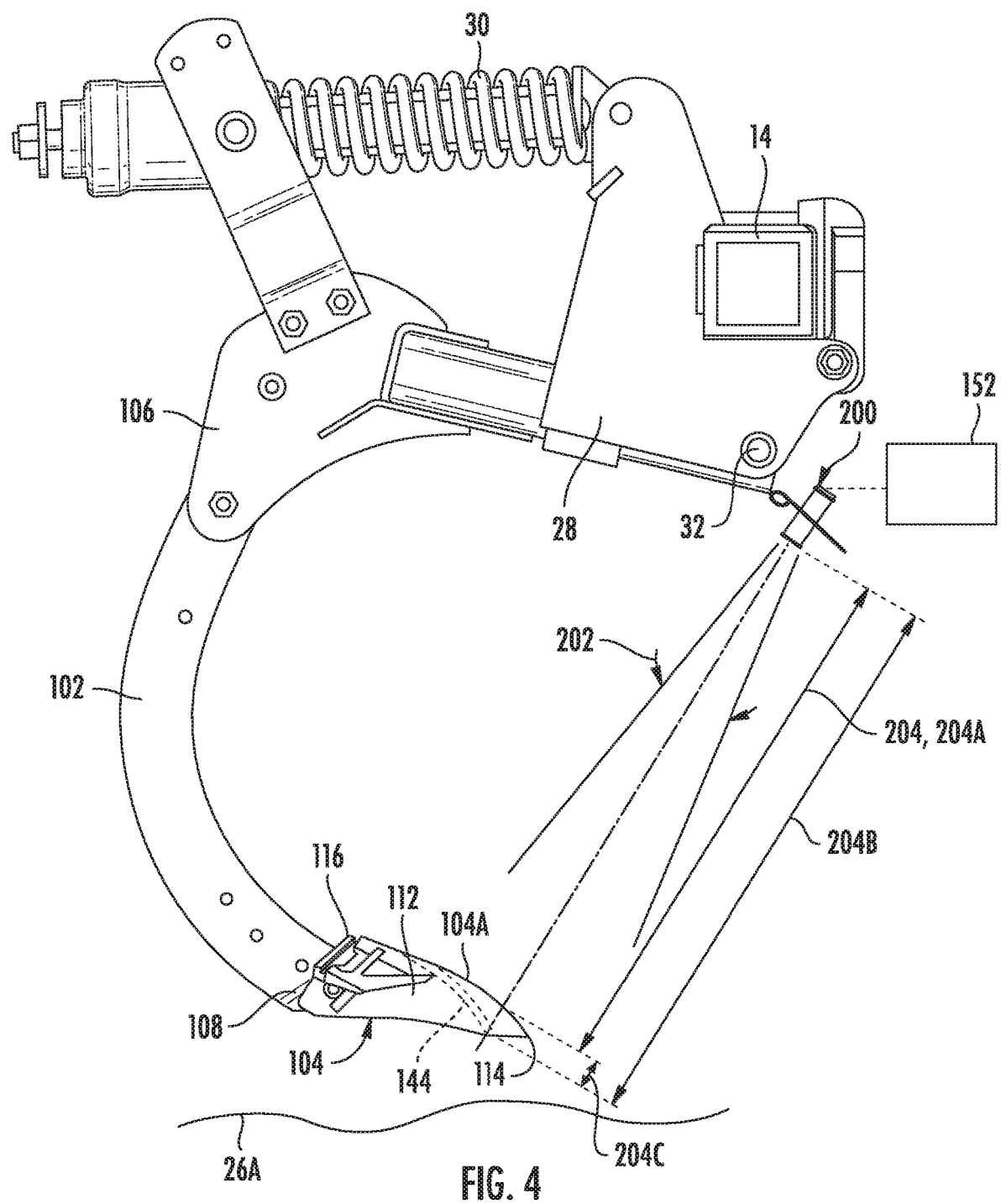
FIG. 4 illustrates another side view of the shank assembly shown in FIG. 2, particularly illustrating one embodiment of a wear sensing device suitable for use in detecting the amount of wear on the associated shank attachment member in accordance with aspects of the present subject matter.

Referring now to FIG. 4, one embodiment of a wear sensor for monitoring the status of the wear of a shank attachment member, such as the tillage point 104 shown in FIG. 2, is illustrated in accordance with aspects of the present subject matter. As indicated above, in several embodiments, the system 150 may include one or more sensors 200 in communication with the controller 152 that are configured to capture data indicative of the wear of the tillage point 104. Specifically, as shown in FIG. 4, each shank assembly 100 may include or be associated with a non-contact wear sensor 200 installed or otherwise positioned remotely from the tillage point 104. For example, as shown in the illustrated embodiment, the wear sensor 200 is fixed relative to the frame 14 of the implement 10, e.g., by being positioned on the rigid mount 28 attached to the frame 14. In such an embodiment, the wear sensor 200 may be configured to capture data indicative of a wear status of the tillage point 104, such as the wear occurring along the outer surface 104A of the point 104. For instance, the wear sensor 200 may include a sensor detection range or field of view 202 that includes all or a portion of the tillage point 104, such as by having a field of view 202 that covers the portion of the tillage point 104 typically subject to wear (e.g., the outer surface 104A of the point 104 at or adjacent to its tip end 114). It should be appreciated that, although the wear sensor 200 is shown in FIG. 4 as being secured to the rigid mount 28 of the shank assembly 100, the wear sensor 200 may generally be installed at any suitable location on the implement 10 that allows the sensor 200 to capture data indicate of the amount of wear occurring in the specific tillage point(s) 104 being monitored by such sensor 200.

In several embodiments, as will be described in greater detail below, the data captured by the wear sensor 200 may be indicative of the reduction in thickness of the body 112 of the tillage point 104 as the outer surface 104A wears down over time, such as by capturing data associated with a distance between the wear sensor 200 and the outer surface 104A of the tillage point 104 adjacent to its tip end 114 (e.g., as indicated by distance 204 in FIG. 4). In such embodiments, it should be appreciated that the wear sensor 200 may generally correspond to any suitable non-contact-based sensor or sensing device configured to capture or provide data indicative of such reduction in thickness. For instance, in several embodiments, the wear sensor 200 may be configured to emit one or more output signals for reflection off of the tillage point 104 and receive or sense the return signal(s). Specifically, in one embodiment, the wear sensor 200 may correspond to an ultrasonic sensor configured to transmit sound waves from the location of the sensor and detect the reflection of such sound waves off of the outer surface 104A of the point 104, thereby providing an indication of the current distance 204 defined between the sensor 200 and the point 104. In another embodiment, the sensor 200 may correspond to a radio detection and ranging (RADAR) sensor configured to transmit radio waves towards the point 104 and receive the return waves reflected off of the outer surface 104A of the point 104. In a further embodiment, the wear sensor 200 may correspond to a vision-based sensor, such as a LIDAR device, a camera (e.g., a stereo camera), and/or the like, that is configured to capture vision-based data associated with the amount of wear occurring on the point 104 (e.g., by detecting the current distance 204 defined between the sensor 200 and the outer surface 104A of the point 104). In other embodiments, the wear sensor 200 may correspond to any other suitable sensor or sensing device configured to capture data associated with the amount of wear occurring on the point 104, such as a magnetic-based sensor or an induction-based sensor.

In the embodiment illustrated in FIG. 4, the tillage point 104 is shown in a new or un-worn condition. In such an un-worn condition, a baseline distance 204A may be defined between the outer surface 104A of the tillage point 104 and the wear sensor 200. In one embodiment, this baseline distance 204A may be initially detected when the point 104 is installed on the shank 102 and stored within the controller's memory 156 based on data received from the wear sensor 200. Alternatively, the baseline distance 204A may be predetermined and/or pre-set within the memory 156 of the controller 150. It should be appreciated that the baseline distance 204A will generally correspond to the minimum distance defined between the outer surface 104A of the tillage point 104 and the wear sensor 200 (assuming the point 104 remains clean and does not accumulate soil or other material on its outer surface 104A). Thus, as the tillage point 104 wears, the current distance 204 between the outer surface 104A of the tillage point 104 and the wear sensor 200 should increase from the baseline distance 204A. Once the tillage point 104 has worn down to a given wear threshold 144 defined relative to the un-worn outer surface of the point 104, the wear sensor 200 may detect that the current distance 204 to the outer surface 104A of the tip 104 is equal to or exceeds a corresponding wear threshold distance 204B indicating that the tillage point 104 needs to be replaced. In such an embodiment, the wear threshold distance 204B may be predetermined and/or pre-set within the memory 156 of the controller 150 according to the specifications of the tillage point 104.

In several embodiments, the controller 152 may be configured to determine the status of the wear of the tillage point 104 by comparing the current distance 204 measured by the wear sensor 200 to a given wear threshold distance. Specifically, in one embodiment, the controller 152 may be configured to compare the current distance 204 to the predetermined threshold distance 204B. For example, if the currently monitored distance 204 is greater than or equal to the threshold distance 204B, the controller 152 may determine that the tillage point 104 was worn to a point at or past the associated wear threshold 144, thereby indicating that the tillage point 104 needs to be replaced. Conversely, if the monitored distance 204 is less than the threshold distance 204B, the controller 152 may determine that the tillage point 104 still has remaining life and, thus, there is no need to replace the point 104 at this time. In such an embodiment, the controller 152 may also be configured to determine or estimate the remaining component life or allowable wear remaining based on a comparison between the current distance 204 and the threshold distance 204B. For example, the controller 152 may subtract the current distance 204 from the threshold distance 204B to determine the remaining wear distance of the tillage point 104 and/or otherwise update the wear status of the tillage point 104. The controller 152 may further be configured to indicate to the operator the status of the wear of the tillage point 104 and/or perform one or more control actions based on the determined wear status of the tillage point 104 as described above with reference to FIG. 3.

In another embodiment, as opposed to using the predetermined threshold distance 204B as a wear threshold distance, the controller 152 may be configured to determine the status of the wear of the tillage point 104 by comparing the current distance 204 measured by the wear sensor 200 to the predetermined baseline distance 204A. For example, if the currently monitored distance 204 is greater than the baseline distance 204A, then the amount of wear the tillage point 104 has undergone may be determined based on comparison between the distance 204 and the baseline distance 204A. For example, the controller 152 may calculate a differential between the baseline distance 204A and the current distance 204 to determine the wear distance of the tillage point 104 and its corresponding wear status. For example, in one embodiment, the wear distance determined based on the differential between the baseline distance 204A and the current distance 204 may be compared to an allowable wear distance 204C (e.g., corresponding to the total wear distance that the tillage point 104 will encounter before reaching the wear threshold 144) to determine the wear status of the tillage point 104. In the embodiment shown in FIG. 4, the allowable wear distance 204C may correspond to the differential between the threshold distance 204B and the baseline distance 2044.

As indicated above, based on the data received from the sensor 200, the controller 152 may be configured to monitor the status of the wear occurring on the associated tillage point 104. In this regard, by installing multiple sensors 200 on the implement 10 (e.g., one on each shank assembly 100), the controller 152 may be configured to monitor the wear status of all or a portion of the tillage points 104 installed on the implement 10. Regardless, by receiving the wear-related data associated with one or more of the tillage points 104, the controller 104 may be further configured to indicate to the operator the status of the \year of such monitored tillage point(s) 104 and/or perform one or more control actions based on the determined wear status of the monitored tillage point(s) 104.

Moreover, in embodiments in which the controller 152 is configured to monitor the wear status of two or more of the tillage points 104 across the implement 10, the controller 152 may utilize such wear data to estimate or determine other parameters and/or conditions associated with the operation of the implement 10. For instance, in one embodiment, the controller 152 may be configured to compare the amount of wear occurring on multiple tillage points 104 across the implement 10 to determine the levelness of the implement 10. For example, if the amount of wear occurring on the tillage points 104 installed on one side of the implement frame 14 (e.g., the left side) is not substantially equal to the amount of wear occurring on the tillage points 104 installed on the opposed side of the implement 10 (e.g., the right side), the controller 152 may determine that the implement 10 is not sufficiently level in the left-to-right or lateral direction (e.g., when the implement 10 has rolled slightly left or right in the lateral direction).

It should be appreciated that, when the wear sensor 200 corresponds to a non-contact-based sensor, it may be desirable for the tillage point 104 being monitored by such sensor 200 to be disposed at a given location relative to ground surface 26A when wear data is being captured, depending, of course, on the type of non-contact-based sensor technology being used. For instance, when the wear sensor 200 corresponds to a non-contact-based sensor that does not generally emit ground-penetrating signals, the tillage point 104 may need to be positioned above the ground surface 26A in order for its wear status to be determined. For example, in the embodiment shown in FIG. 4, if the wear sensor 200 is configured as an ultrasonic sensor or a vision sensor, it may be necessary for the frame 14 to be actuated or moved to its raised position at which the tillage points 104 are located above the ground surface 26A for the wear status of such tillage points 104 to be determined. In such embodiment, when it is desired to capture wear data, the controller 152 may be configured to control the frame actuators 14A of the implement 10 to actuate the frame 14 from its lowered or work position into its raised position to allow each wear sensor 200 to capture wear data associated with its respective tillage point(s) 104. Of course, in embodiments in which the wear sensor(s) 200 is capable of capturing wear-related data while the points 104 are located within the ground (e.g., a ground-penetrating radar device), the frame 14 may be maintained at its lowered or work position while such data is being captured.

Figure 5:
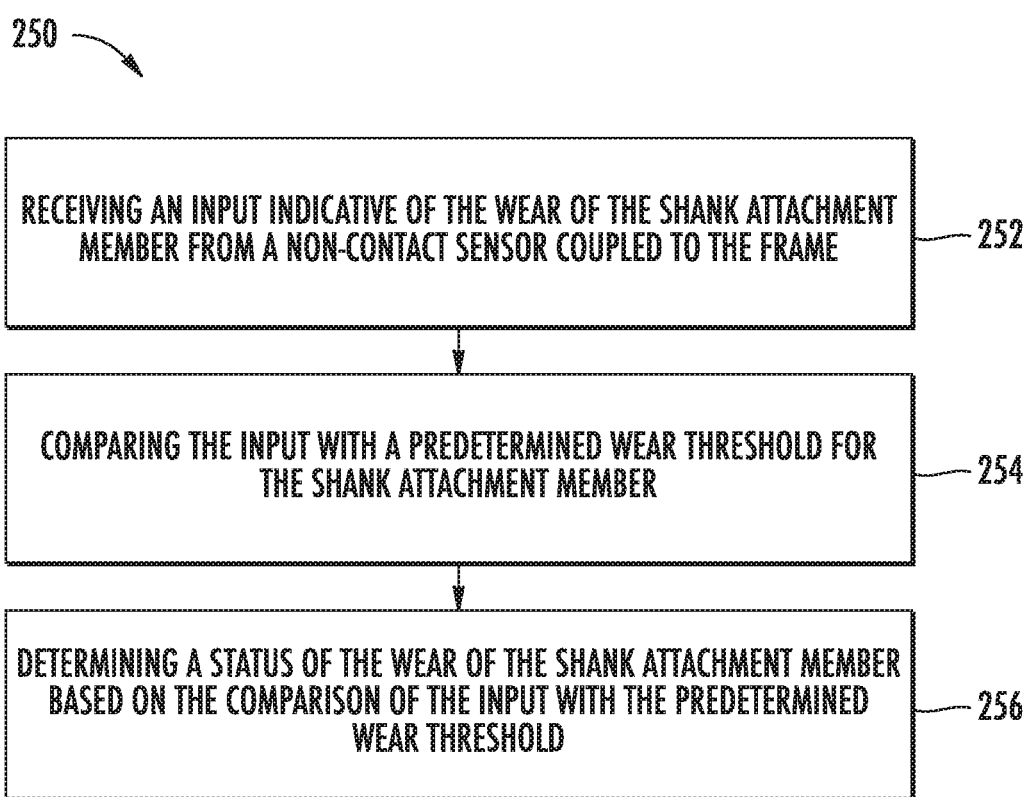
FIG. 5 illustrates a flow diagram of one embodiment of a method for detecting the wear of a shank attachment member of an agricultural implement in accordance with aspects of the present subject matter.

Referring now to FIG. 5, a flow diagram of one embodiment of a method 250 for monitoring the wear of a shank attachment member of an agricultural implement is illustrated in accordance with aspects of the present subject matter. In general, the method 250 will be described herein with reference to the implement 10 and the shank assembly 100 shown in FIGS. 1 and 2, as well as the embodiment of system 150 shown in FIG. 4. However, it should be appreciated that the disclosed method 250 may be executed with implements and/or shank assemblies having any other suitable configurations and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 5, at (252), the method 250 may include receiving an input indicative of the wear of a shank attachment member from a non-contact sensor supported relative to a frame of an agricultural implement. For example, as indicated above, the controller 152 may be communicatively coupled to one or more non-contact-based wear sensors 200, with each sensor 200 being configured to provide sensor data indicative of the amount of wear occurring on a respective shank attachment member(s) of the implement 10, such as one or more of the tillage points 104 of the implement 10, in one embodiment, as described above, the sensor data may be indicative of a distance defined between the sensor 200 and the outer surface 104A of the tillage point 104.

Additionally, at (254), the method 250 may include comparing the input with a predetermined wear threshold for the shank attachment member. For example, as indicated above, the controller 152 may compare the wear-related sensor data to one or more predetermined wear thresholds defined for the shank attachment member. For instance, when the sensor data is indicative of a distance 204 defined between the wear sensor 200 and the outer surface 104A of the point 104, the controller 152 may be configured to compare the monitored distance 204 to a corresponding predetermined threshold distance, such as the baseline distance 204A and/or the threshold distance 204B described above with reference to FIG. 4.

Moreover, at (256), the method 250 may include determining a status of the wear of the shank attachment member based on the comparison of the input with the predetermined wear threshold. For example, as discussed above, the controller 152 may determine that the wear of the tillage point 104 is unacceptable and that the tillage point 104 needs to be replaced if the currently monitored distance 204 is greater than or equal to the threshold distance 204B, and/or if the amount of wear from the baseline distance 204A is greater than an allowable wear distance threshold 204C.

Figure 6:
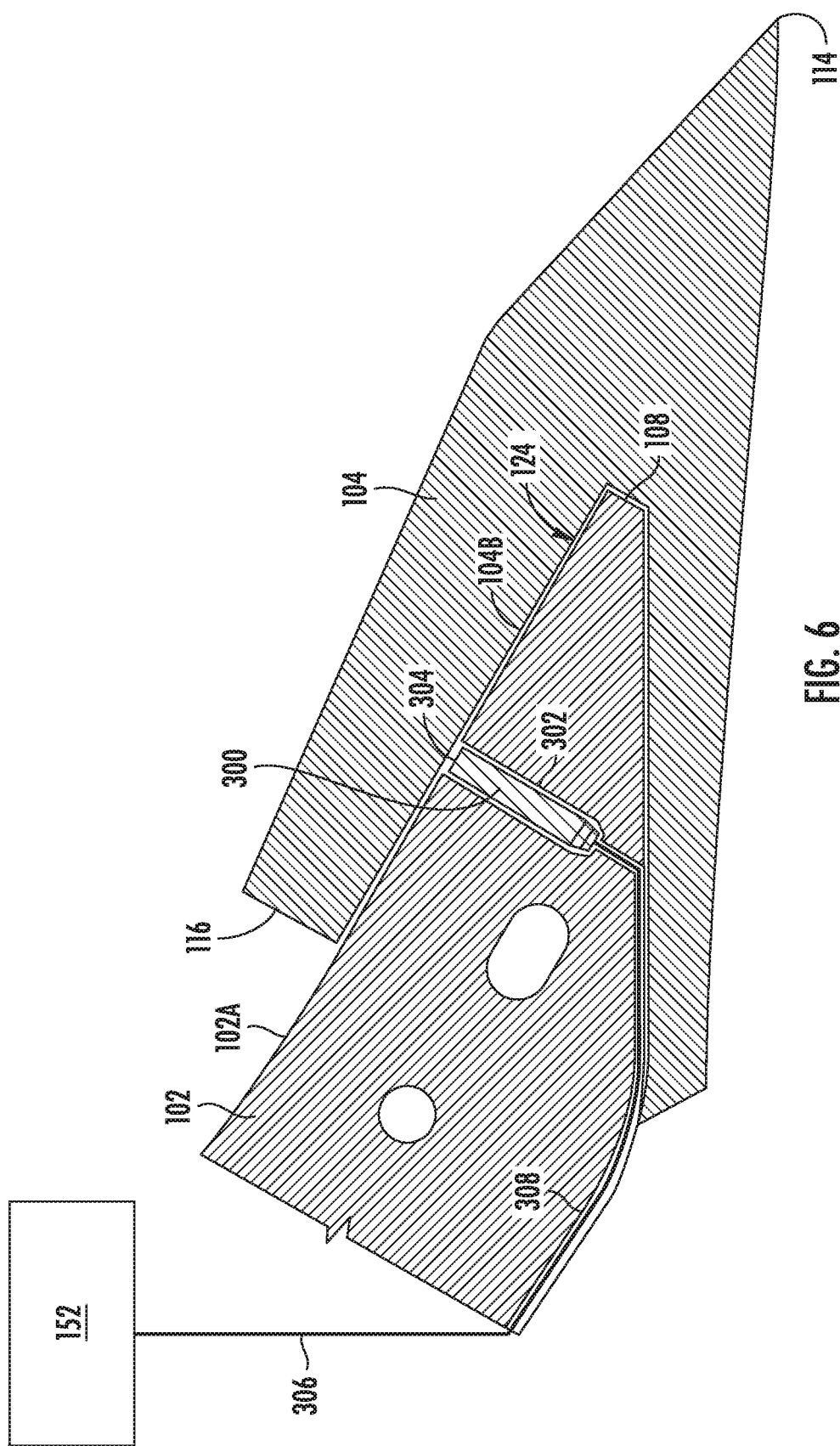
FIG. 6 illustrates a partial, cross-sectional view of the distal end of the shank assembly shown in FIG. 2, particularly illustrating one embodiment of a presence sensing device suitable for use in detecting the presence of an adjacent shank attachment member in accordance with aspects of the present subject matter.

Referring now to FIG. 6, a cross-sectional view of one embodiment of an installation sensor for monitoring the installation status or presence of a shank attachment member, such as the tillage point 104 shown in FIG. 2, of an agricultural implement is illustrated in accordance with aspects of the present subject matter. As indicated above, the system 150 may include one or more installation sensors 300 in communication with the system controller 152 that are configured to provide data indicative of the installation status of a respective tillage point 104 relative to its corresponding shank 102. Specifically, as shown in FIG. 6, in several embodiments, each shank assembly 100 may include one or more installation sensors 300 at least partially embedded or otherwise positioned within the shank 102. For example, in the illustrated embodiment, the installation sensor 300 is installed within a sensor opening 302 defined in the shank 102 at a given position at which the sensor 300 may be configured to detect the presence of an adjacent tillage point 104, such as by defining the opening 302 within the portion of the shank 104 extending from its distal end 108 that is configured to be received within the retention slot 124 of the tillage point 104. In some embodiments, the sensor opening 302 may be positioned approximately along a center of the width of the shank 102, as shown with the section view of the shank 102 and tillage point 104 in FIG. 6 taken at approximately the center of the width of the shank 102 and tillage point 104. However, it should be appreciated that, in other embodiments, the sensor opening may instead be positioned in any other suitable position within the shank 102.

In the illustrated embodiment, the installation sensor 300 generally includes a sensing end 304 configured to be positioned adjacent the tillage point 104 when the tillage point 104 is installed on the shank 102. For example, as shown in FIG. 6, the installation sensor 300 may be configured to be embedded within the sensor opening 302 of the shank 102 such that the sensing end 304 of the installation sensor 300 is positioned generally flush with the outer surface 102A of the shank 102. As such, when the point 104 is installed on the shank 102, the sensing end 304 of the installation sensor 300 may positioned directly adjacent to the inner surface 104B of the tillage point 104, thereby allowing the sensor 300 to efficiently monitor the presence of the point 104. While the installation sensor 300 is shown as extending towards the inner surface 104B of the tillage point 104 adjacent to an upper surface of the shank 102, it should be appreciated that the installation sensor 300 may instead be oriented towards any other suitable portion of the inner surface 104B of the tillage point 104. Moreover, by positioning the installation sensor 300 within the portion of the shank 102 that is received within the retention slot 124 of the tillage point 104, the sensor 300 may be protected within the tillage point 104 and shank 102 from environmental factors, thereby allowing the sensor 300 to collect data corresponding to the installation status of the tillage point 104 while the implement 10 is operating and the tillage point 104 is located below the ground surface 26A.

In one embodiment, the controller 152 may be configured to determine the installation status of the tillage point 104 by monitoring a change in the output of the installation sensor 300. For example, in one embodiment, the installation sensor 300 may correspond to any suitable sensor or sensing device configured to change its output signal or data based on the presence (or lack thereof) of the tillage point 104 relative to the shank 102. In one implementation, the installation sensor 300 may simply have a binary output, such as a first output (e.g. an output of "1") when the tillage point 104 is present or installed on the shank 102 and a second output (e.g., an output of "0") when the tillage point 104 is not present or installed on the shank 102. In such an implementation, if the output of the installation sensor 300 remains equal to the first output, the controller 152 may determine that the tillage point 104 is still present relative to the shank 102. However, if the output of the installation sensor 300 changes from the first output, for example if the output of the installation sensor 300 changes from a value of "1" to a value of "0," then the controller 152 may determine that the tillage point 104 is not present relative to the shank 102 and, thus, it may be inferred that the point 104 has fallen off or has otherwise become decoupled from the shank 102.

It should be appreciated that the installation sensor(s) 300 may generally correspond to any suitable sensing device(s). For example, in one embodiment, each installation sensor 300 may correspond to a proximity sensor, such as an inductive sensor that is configured to detect the tillage point 104 based on detection of the metallic-based material used to form the point 104. Alternatively, the installation sensor(s) 300 may correspond to any other suitable proximity sensor, such as a magnetic proximity sensor, a Reed sensor, a variable reluctance sensor, and/or the like, configured to detect the presence of the tillage point 104, such as by directly detecting the tillage point 104 or by detecting a component associated with the tillage point 104 (e.g., a magnet or other detectable component embedded within or otherwise installed relative to the point 104). In other embodiments, the installation sensor(s) 300 may correspond to any other suitable sensor or sensing device, such as radar sensor, an ultrasonic sensor(s), a vision-based sensor and/or the like.

It should be appreciated that, when the installation sensor(s) 300 is configured to be embedded within the shank 102 or otherwise positioned within the retention slot 124 of the tillage point 104, the sensor(s) 300 may be powered and in communication with the controller 152 using any suitable powered/communicative link and/or configuration(s). For example, as shown in FIG. 6, each installation sensor 300 may be electrically connected to the controller 152 via a cable or wire 306 running to the sensor opening 302 of the shank 102. In such an embodiment, the shank 102 may further be configured with a channel 308 to protect the cable 306 from damage during operation of the implement 10. Alternatively or additionally, each installation sensor 300 may be powered by its own battery (not shown) and/or may be wirelessly connected to the controller 152. For instance, each sensor 300 may include or be associated with a wireless transmitter configured to wireless transmitter data to the controller 152.

Figure 7:
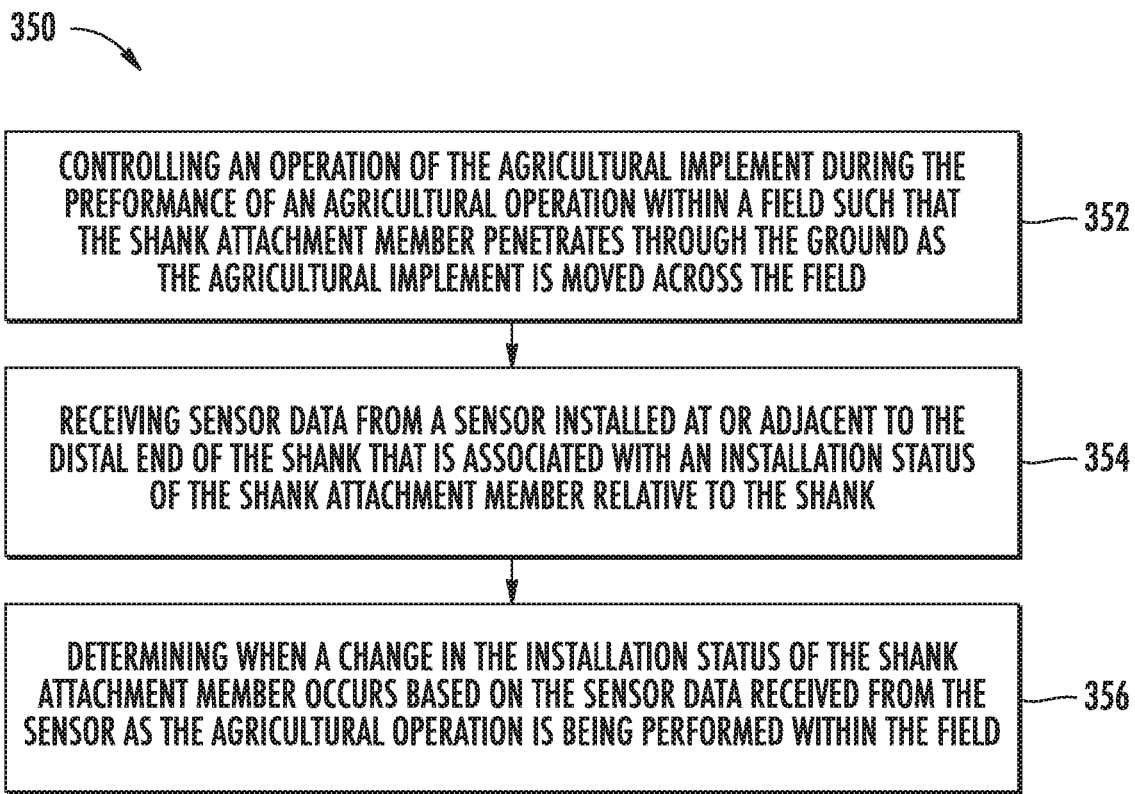
FIG. 7 illustrates a flow diagram of one embodiment of a method for detecting the presence of a shank attachment member of an agricultural implement accordance with aspects of the present subject matter.

Referring now to FIG. 7, a flow diagram of one embodiment of a method 350 for monitoring an installation status of a shank attachment member of an agricultural implement is illustrated in accordance with aspects of the present subject matter. In general the method 350 will be described herein with reference to the implement 10 and the shank assembly 100 shown in FIGS. 1 and 2, as well as the embodiment of the system 150 shown in FIG. 6. However, it should be appreciated that the disclosed method 350 may be executed with implements and/or shank assemblies having any other suitable configurations and/or with systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 7, at (352), the method 350 may include controlling the operation of an agricultural implement during the performance of an agricultural operation within a field such that a shank attachment member of the implement penetrates through the ground as the implement is moved across the field. For example, as discussed above, the controller 152 may be configured to directly or indirectly control the operation of one or more components of the implement 10, such as by controlling the actuation of one or more of the frame actuators 14A to move the implement frame 14 between its raised and lowered positions. As a result, when it is desired to perform a tillage operation within the field, the controller 152 may be configured to control the frame actuators 14A such that the frame 14 is moved to its lowered position (FIG. 2) at which the tillage points 104 are located below the ground surface 26A and, thus, penetrate through the ground 26 as the implement 10 is moved across the field.

Additionally, at (354), the method 350 may include receiving sensor data from a sensor installed at or adjacent to the distal end of the shank that is associated with an installation status of the shank attachment member relative to the shank. For example, as indicated above, the controller 152 may be communicatively coupled to one or more installation sensors 300, with each sensor 300 being installed at or adjacent to the distal end 108 of a corresponding shank 102 (e.g., by installing the sensor 300 within a sensor opening 302 defined within a portion of the shank 102 received within the respective shank attachment member 104. In such an embodiment, the controller 152 may be configured to receive data from each installation sensor 300 associated with the installations status of the associated shank attachment member 104 (e.g., whether the member 104 is present or not relative to the shank 102)

Moreover, at (356), the method 350 may include determining when a change in the installation status of the shank attachment member occurs based on the sensor data received from the sensor as the agricultural operation is being performed within the field. For example, as indicated above, the controller 152 may be configured to monitor the sensor data received from each installation sensor 300 and determine when a change in the installation status of the tillage point 104 occurs based on such sensor data. For instance, in one embodiment, the controller 152 may detect a change in a binary output received from each installation sensor 300, thereby indicating a change in the installation status of the associated tillage point 104.

Figure 8:
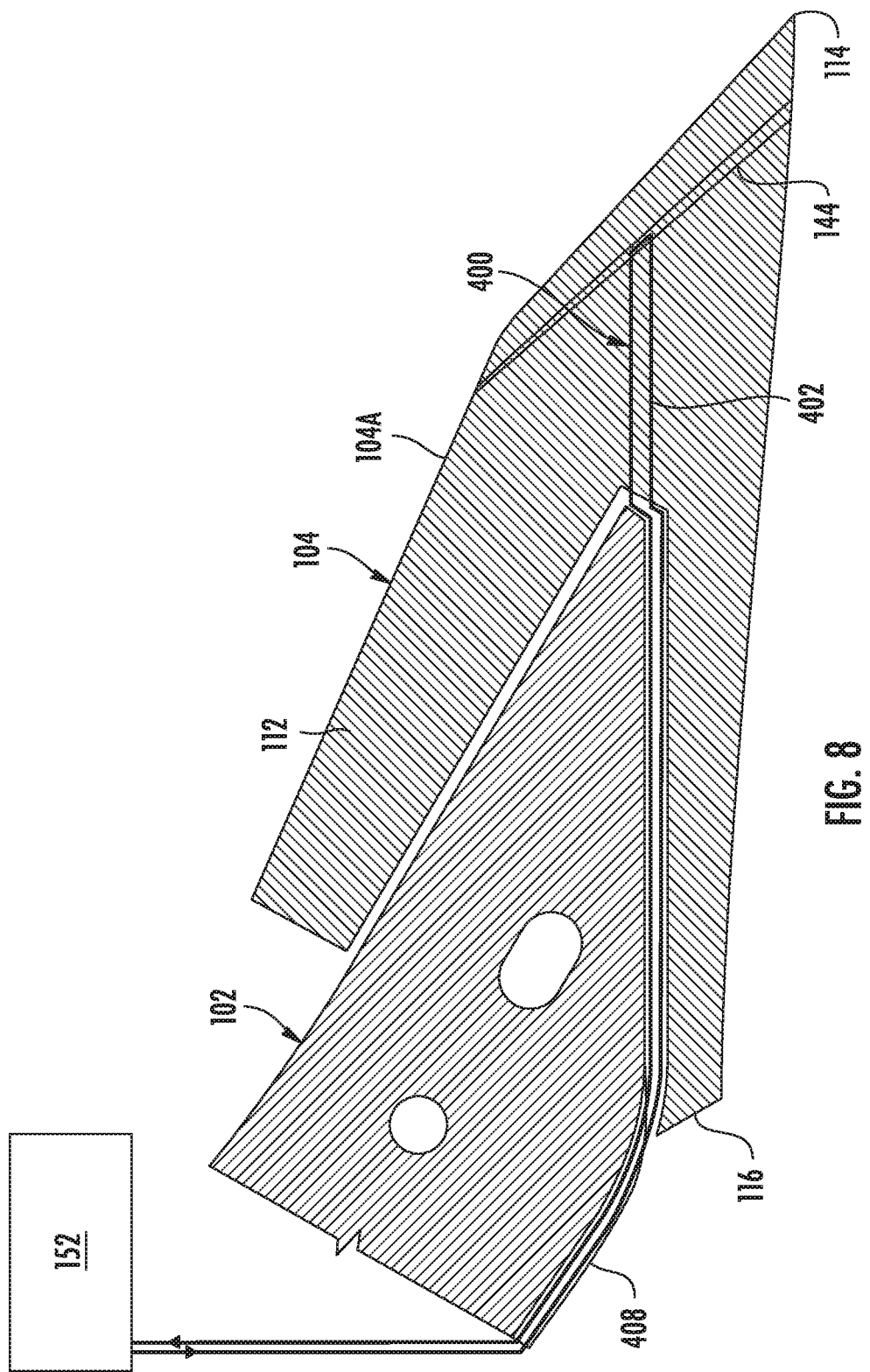
FIG. 8 illustrates a partial, cross-sectional view of the shank attachment member shown in FIG. 2, particularly illustrating another embodiment of a wear sensing device suitable for use in detecting the amount of wear on the associated shank attachment member in accordance with aspects of the present subject matter.

Referring now to FIG. 8, another embodiment of a wear sensor for monitoring the status of the wear of a shank attachment member, such as the tillage point 104 shown in FIG. 2, is illustrated in accordance with aspects of the present subject matter. As indicated above, in several embodiments, the system 150 may include one or more sensors 400 in communication with the controller 152 that are configured to monitor the wear status of an associated tillage point 104. Specifically, as shown in FIG. 8, each shank assembly 100 may include one or more local wear sensors 400 installed or otherwise positioned at least partially within the tillage point 104. For example, in the illustrated embodiment, the local wear sensor 400 extends within the body 112 of the tillage point 104 so as to be positioned at or adjacent to the location of the wear threshold 144 defined for the point 104. As such, the local wear sensor 400 may be configured to detect when the outer surface 104A of the point 104 has worn down to the location of the wear threshold 144.

In one embodiment, the controller 152 may be configured to determine the wear status of the tillage point 104 by detecting a change in the output of the local wear sensor 400. For example, as shown in FIG. 8, in one embodiment, the local wear sensor 400 corresponds to a conductive loop that includes an electrical conduit or wire 402 forming a closed circuit with the controller 152. In such an embodiment, the controller 152 may be configured to transmit a signal through the wire 402 and receive such signal back when the closed loop formed by the wire 402 is unworn or unbroken. Thus, as long as the wire 402 remains intact and forms a closed loop, the controller 152 will capable of transmitting and receiving a signal across the wire 42, thereby indicating that the tillage point 104 is still acceptable for use. However, as the outer surface 104A of the tillage point 104 wears down to and/or past the location of the wear threshold 144, the conductive loop will become an open circuit as the wire 402 breaks or otherwise wears through. In such instance, the controller 152 will no longer be able to transmit and receive a signal across the wire 402, thereby indicating that the tillage point 104 is worn out and needs to be replaced. In some embodiments, as shown in FIG. 8, the wire 402 may be configured to be at least partially received within the retention slot 124 of the tillage point 104. Further, in some embodiments, as shown in FIG. 8, the wire 402 may be at least partially received within a channel 408 of the shank 102.

It should be appreciated that, as an alternative to the sensor/configuration shown in FIG. 8, the local wear sensor(s) 400 may generally correspond to any suitable sensing device(s) and/or may have any other suitable sensor configuration. For example, as opposed to a single wire 402 forming a single conductive loop, the local wear sensor 400 may include a plurality of wires 402 forming a corresponding number of conductive loops, with each wire 402 forming a separate circuit with the controller 152 and being positioned in a different discrete location within the tillage point 104. In such an embodiment, each wear sensor 400 may be configured to detect different degrees of wear as the outer surface 104A wears down to the location of each wire 402. In some embodiments, the local wear sensor 400 may be positioned approximately along a center of the width of the tillage point 104, as shown with the section view of the shank 102 and tillage point 104 in FIG. 8 taken at approximately the center of the width of the shank 102 and tillage point 104. However, it should be appreciated that, in other embodiments, the local wear sensor 400 may instead be positioned in any other suitable position within the tillage point 104.

Figure 9:
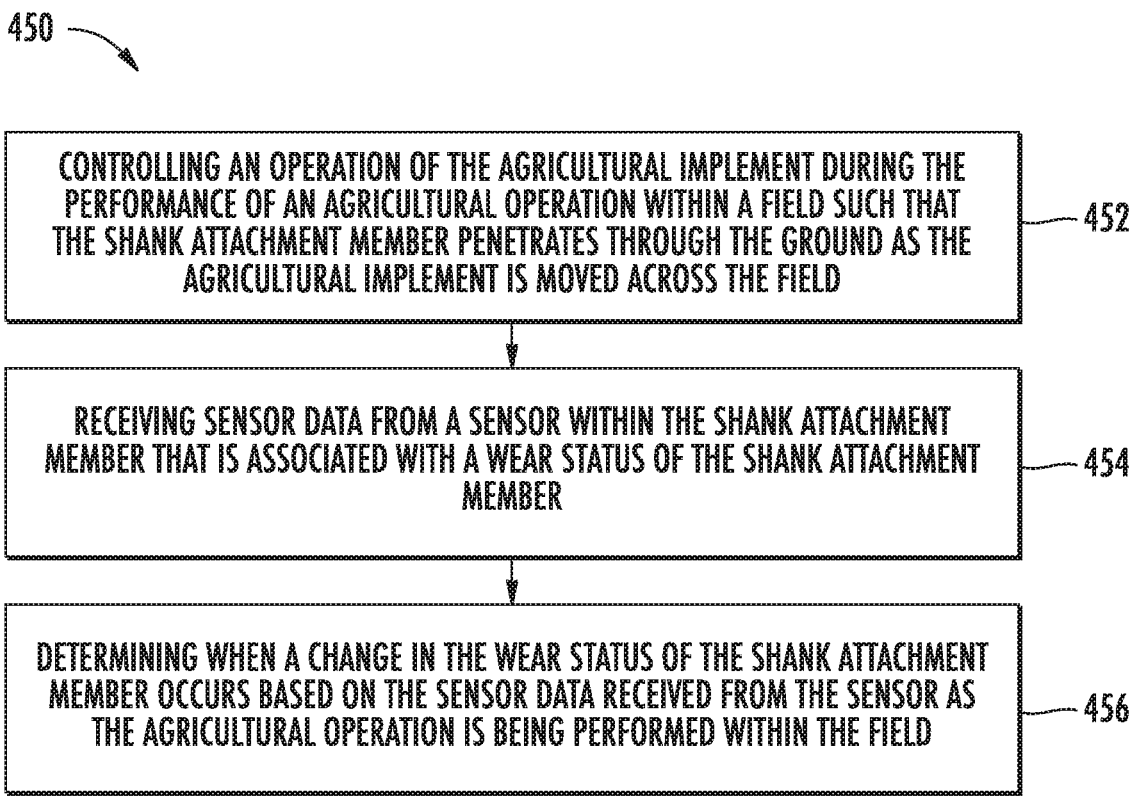
FIG. 9 illustrates a flow diagram of another embodiment of a method for detecting the wear of a shank attachment member of an agricultural implement in accordance with aspects of the present subject matter.

Referring now to FIG. 9, a flow diagram of another embodiment of a method 450 for monitoring the wear of a shank attachment member of an agricultural implement is illustrated in accordance with aspects of the present subject matter. In general, the method 450 will be described herein with reference to the implement 10 and the shank assembly 100 shown in FIGS. 1 and 2, as well as the embodiment of the system 150 shown in FIG. 8. However, it should be appreciated that the disclosed method 450 may be executed with implements and/or shank assemblies having any other suitable configurations and/or with systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 9, at (452), the method 450 may include controlling the operation of an agricultural implement during the performance of an agricultural operation within a field such that a shank attachment member of the implement penetrates through the ground as the agricultural implement is moved across the field. For example, as discussed above, the controller 152 may be configured to directly or indirectly control the operation of one or more components of the implement 10, such as by controlling the actuation of one or more frame actuators 14A to move the implement frame 14 between its raised and lowered positions. As a result when it is desired to perform a tillage operation within the field, the controller 152 may be configured to control the frame actuators 14A such that the frame 14 is moved to its lowered position (FIG. 2) at which the tillage points 104 are located below the ground surface 26A and, thus, penetrate through the ground 26 as the implement 10 is moved across the field.

Additionally, at (454), the method 450 may include receiving sensor data from a sensor installed within the shank attachment member that is associated with a wear status of the shank attachment member. For example, as indicated above, the controller 152 may be communicatively coupled to one or more local wear sensors 400, with each local wear sensor 400 being installed within the tip end 114 of the tillage point 104 (e.g., by embedding the local wear sensor 400 within the tillage point at or adjacent to the wear threshold 144), the controller 152 may be configured to receive data from each local wear sensor 400 associated with the wear status of the associated tillage point 104 (e.g., whether the tillage point 104 has worn to or exceeded the wear threshold 144).

Moreover, at (456), the method 450 may include determining when a change in the wear status of the shank attachment member occurs based on the sensor data received from the sensor as the agricultural operation is being performed within the field. For example, as indicated above, the controller 152 may be configured to monitor the sensor data received from each local wear sensor 400 and determine when a change in the wear status of the tillage point 104 occurs based on such sensor data. For instance, in one embodiment, the controller 152 may experience a change in its ability to transmit and receive a signal across the local wear sensor 400, thereby indicating a change in the wear status of the associated tillage point 104.

It is to be understood that, in several embodiments, the steps of the methods 250, 350, and 450 are performed by the controller 152 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 152 described herein, such as the methods 250, 350, and 450, is implemented in software code or instructions which are tangibly stored on a tangible computer readable medium. The controller 152 loads the software code or instructions via a direct interface with the computer readable medium or via a wired and/or wireless network. Upon loading and executing such software code or instructions by the controller 152, the controller 152 may perform any of the functionality of the controller 152 described herein, including any steps of the methods 250, 350, and 450 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wear monitoring system for shank attachment members of an agricultural implement, the wear monitoring system comprising:
    a shank extending between a proximal end and a distal end, the proximal end configured to be pivotally coupled to a portion of the agricultural implement;
    a shank attachment member coupled to the distal end of the shank;
    a non-contact sensor positioned remote to the shank attachment member, the non-contact sensor configured to detect a parameter indicative of wear of the shank attachment member, the non-contact sensor comprising a ground-penetrating radar sensor; and
    a controller communicatively coupled to the non-contact sensor, the controller configured to determine a status of the wear of the shank attachment member based on sensor data received from the non-contact sensor, the sensor data including the parameter indicative of the wear of the shank attachment member,
    wherein the non-contact sensor is configured to generate the sensor data when the shank attachment member is positioned at least partially below a ground surface.

2. The wear monitoring system of claim 1, wherein the non-contact sensor is configured to detect a distance between the non-contact sensor and an outer surface of the shank attachment member, the distance being indicative of the wear of the shank attachment member.

3. The wear monitoring system of claim 1, wherein the shank attachment member includes a body defining a tip end, the non-contact sensor being configured to detect a distance between the non-contact sensor and an outer surface of the shank attachment member adjacent to its tip end.

4. The wear monitoring system of claim 1, further comprising a user interface in communication with the controller, the controller being configured to indicate the status of the wear of the shank attachment member to an operator of the agricultural implement via the user interface.

5. The wear monitoring system of claim 1, wherein the controller is configured to adjust an operation of the agricultural implement based at least in part on the determined status of the wear of the shank attachment member.

6. The wear monitoring system of claim 1, wherein the non-contact sensor is configured to be coupled to a frame of the agricultural implement, the non-contact sensor having a field of view directed towards the shank attachment member.

7. The wear monitoring system of claim 1, wherein the shank attachment member comprises a tillage point.

8. An agricultural implement, comprising:
a frame configured to be actuated relative to a ground surface between a raised position and a lowered position;
a shank extending between a proximal end and a distal end, the proximal end being pivotally coupled to the frame;
a shank attachment member coupled to the distal end of the shank;
a non-contact sensor coupled to the frame, the non-contact sensor configured to detect a parameter indicative of wear of the shank attachment member, the non-contact sensor comprising a ground-penetrating radar sensor; and
a controller communicatively coupled to the non-contact sensor, the controller configured to determine a status of the wear of the shank attachment member based on sensor data received from the non-contact sensor, the sensor data including the parameter indicative of the wear of the shank attachment member,
wherein the non-contact sensor is configured to generate the sensor data when the shank attachment member is positioned at least partially below the ground surface.

9. The agricultural implement of claim 8, wherein the non-contact sensor is configured to detect a distance between the non-contact sensor and an outer surface of the shank attachment member, the distance being indicative of the wear of the shank attachment member.

10. The agricultural implement of claim 8, wherein the shank attachment member includes a body defining a tip end, the non-contact sensor being configured to detect a distance between the non-contact sensor and an outer surface of the shank attachment member adjacent to its tip end.

11. The agricultural implement of claim 8, wherein the controller is configured to indicate the status of the wear of the shank attachment member to an operator of the agricultural implement via a user interface communicatively coupled to the controller.

12. The agricultural implement of claim 8, wherein the controller is configured to adjust an operation of the agricultural implement based at least in part on the determined status of the wear of the shank attachment member.

13. The agricultural implement of claim 8, wherein the non-contact sensor is coupled to the frame such that the non-contact sensor has a field of view directed towards the shank attachment member.

14. The agricultural implement of claim 8, wherein the shank attachment member comprises a tillage point.

15. A method for monitoring wear of a shank attachment member of an agricultural implement, the agricultural implement including a frame configured to be actuated relative to ground surface between a raised position and a lowered position, a shank extending between a proximal end and a distal end, the proximal end being pivotally coupled to the frame, the agricultural implement further including a shank attachment member coupled to the distal end of the shank, the method comprising:
receiving, with a computing device, an input indicative of the wear of the shank attachment member from a non-contact sensor supported relative to the frame,
comparing, with the computing device, the input with a predetermined wear threshold for the shank attachment member, and
determining, with the computing device, a status of the wear of the shank attachment member based on the comparison of the input with the predetermined wear threshold,
wherein the non-contact sensor comprises a ground-penetrating radar sensor, the non-contact sensor being able to generate the input indicative of the wear of the shank attachment member when the shank attachment member is positioned at least partially below the ground surface.

16. The method of claim 15, further comprising indicating, with the computing device, to an operator of the implement that the shank attachment member needs to be replaced based on the determined status of the wear.

* * * * *